United States Patent
Colson et al.

(10) Patent No.: US 9,829,006 B2
(45) Date of Patent: Nov. 28, 2017

(54) AIR CYCLE MACHINE COMPRESSOR HOUSING

(71) Applicant: HAMILTON SUNDSTRAND CORPORATION, Windsor Locks, CT (US)

(72) Inventors: Darryl A. Colson, West Suffield, CT (US); Craig M. Beers, Wethersfield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 195 days.

(21) Appl. No.: 14/883,184

(22) Filed: Oct. 14, 2015

(65) Prior Publication Data

US 2017/0107993 A1    Apr. 20, 2017

(51) Int. Cl.
| | |
|---|---|
| *F04D 27/00* | (2006.01) |
| *F01D 25/24* | (2006.01) |
| *F04D 29/42* | (2006.01) |
| *F04D 29/62* | (2006.01) |

(52) U.S. Cl.
CPC ......... *F04D 27/009* (2013.01); *F01D 25/243* (2013.01); *F04D 29/4233* (2013.01); *F04D 29/624* (2013.01); *F05D 2240/242* (2013.01); *F05D 2260/606* (2013.01)

(58) Field of Classification Search
CPC .. F04D 27/009; F04D 29/4206; F04D 29/422; F01D 25/243; F01D 25/24; B64D 2013/0647; F05D 2260/606
See application file for complete search history.

(56) References Cited

U.S. PATENT DOCUMENTS

| | | | | |
|---|---|---|---|---|
| 8,511,971 | B2* | 8/2013 | Hollman | F01D 25/162 415/121.2 |
| 8,757,960 | B2* | 6/2014 | Lugo | B64D 13/06 415/115 |
| 2013/0287555 | A1* | 10/2013 | Rosen | F04D 17/122 415/182.1 |
| 2014/0030080 | A1* | 1/2014 | Chrabascz | F01D 25/285 415/203 |

* cited by examiner

*Primary Examiner* — Woody Lee, Jr.
*Assistant Examiner* — Sabbir Hasan
(74) *Attorney, Agent, or Firm* — Cantor Colburn LLP

(57) ABSTRACT

An air cycle machine (ACM) compressor housing includes a body including an exterior surface and an interior portion. An inlet is integrally formed with the body. The inlet includes an inlet passage fluidically connected with the interior portion. An outlet is integrally formed with the body. The outlet includes an outlet passage fluidically connected with the interior portion. A bypass is integrally formed with the body. The bypass includes a bypass passage fluidically connected with the interior portion. The bypass passage includes a first end portion extending outwardly from the body, a second end portion and an intermediate portion extending therebetween. The first end portion includes a wall thickness of between about 0.330-inch (8.382-mm) and 0.390-inch (9.906-mm).

13 Claims, 7 Drawing Sheets

AIR CYCLE MACHINE COMPRESSOR HOUSING

BACKGROUND

Exemplary embodiments pertain to the art of air cycle machines and, more particularly to an air cycle machine compressor housing.

Air cycle machines (ACM) typically include a compressor portion and one or more turbine portions. Typically, an energy laden fluid stream is passed through the one or more turbine portions to create a rotational energy. The rotational energy is transferred to the compressor portion. The compressor portion imparts the energy to another fluid flow. Conventionally, the compressor raises a pressure and a velocity of the another fluid flow. In some cases, the air cycle machine operates at high pressures and temperatures. As such, various engineering considerations dictate the use of specific materials and/or dimensions. Often times, the specific materials lead to an overall weight of the air cycle machine that may be are incompatible with certain desired installations.

BRIEF DESCRIPTION

Disclosed is an air cycle machine (ACM) compressor housing including a body including an exterior surface and an interior portion. An inlet is integrally formed with the body. The inlet includes an inlet passage fluidically connected with the interior portion. An outlet is integrally formed with the body. The outlet includes an outlet passage fluidically connected with the interior portion. A bypass is integrally formed with the body. The bypass includes a bypass passage fluidically connected with the interior portion. The bypass passage includes a first end portion extending outwardly from the body, a second end portion and an intermediate portion extending therebetween. The first end portion includes a wall thickness of between about 0.330-inch (8.382-mm) and 0.390-inch (9.906-mm).

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
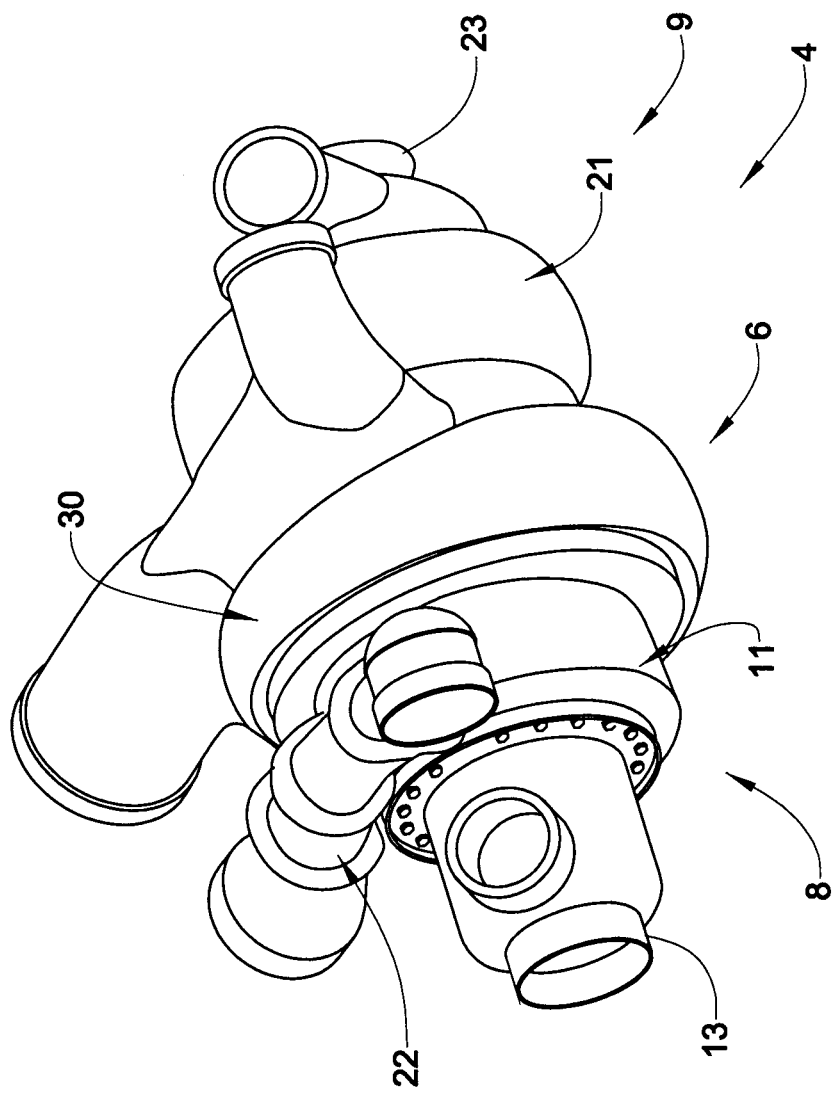
FIG. 1 is a perspective view of an air cycle machine (ACM) including a compressor housing, in accordance with an exemplary embodiment.

An air cycle machine (ACM), in accordance with an exemplary embodiment, is illustrated generally at 4 in FIG. 1. ACM 4 includes a compressor portion 6, a first turbine portion 8 and a second turbine portion 9. First turbine portion 8 includes a first turbine housing 11 having a first turbine inlet 12 (FIG. 2) and a first turbine outlet 13. A first rotor 15 is arranged within first turbine housing 11. First rotor 15 is operatively coupled to a shaft 17. A high energy airflow passing into first turbine inlet 12 acts upon first rotor 15 before passing through first turbine outlet 13. First rotor 15 converts energy from the high energy airflow into a rotational energy that is imparted to shaft 17.

Second turbine portion 9 includes a second turbine housing 21 having a second turbine inlet 22 and a second turbine outlet 23. A second rotor 25 is arranged within second turbine housing 21. Second rotor 25 is also operatively coupled to a shaft 17. A high energy airflow passing into second turbine inlet 22 acts upon second rotor 25 before passing through second turbine outlet 23. Second rotor 25 converts energy from the high energy airflow into a rotational energy that is also imparted to shaft 17.

Figure 2:
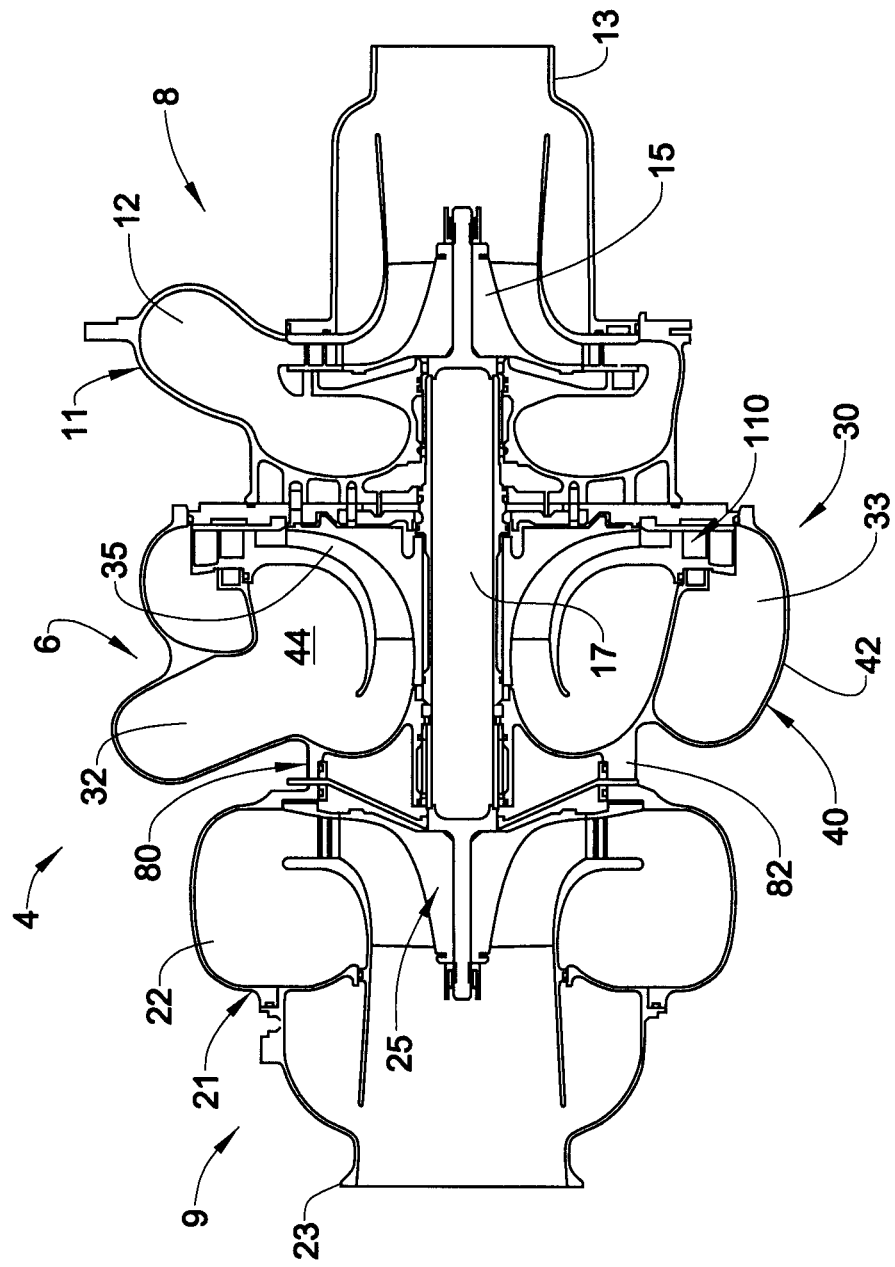
FIG. 2 is a cross-sectional view of the ACM of FIG. 1.
Figure 3:
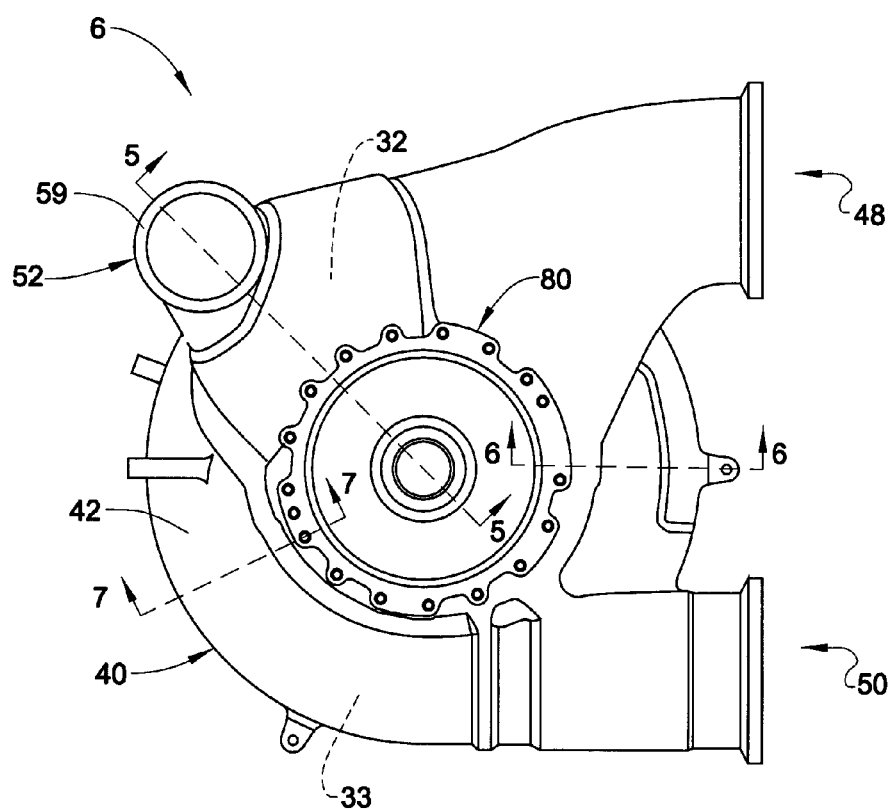
FIG. 3 is a plan view of a first side of the compressor housing of FIG. 1, in accordance with an aspect of an exemplary embodiment.
Figure 4:
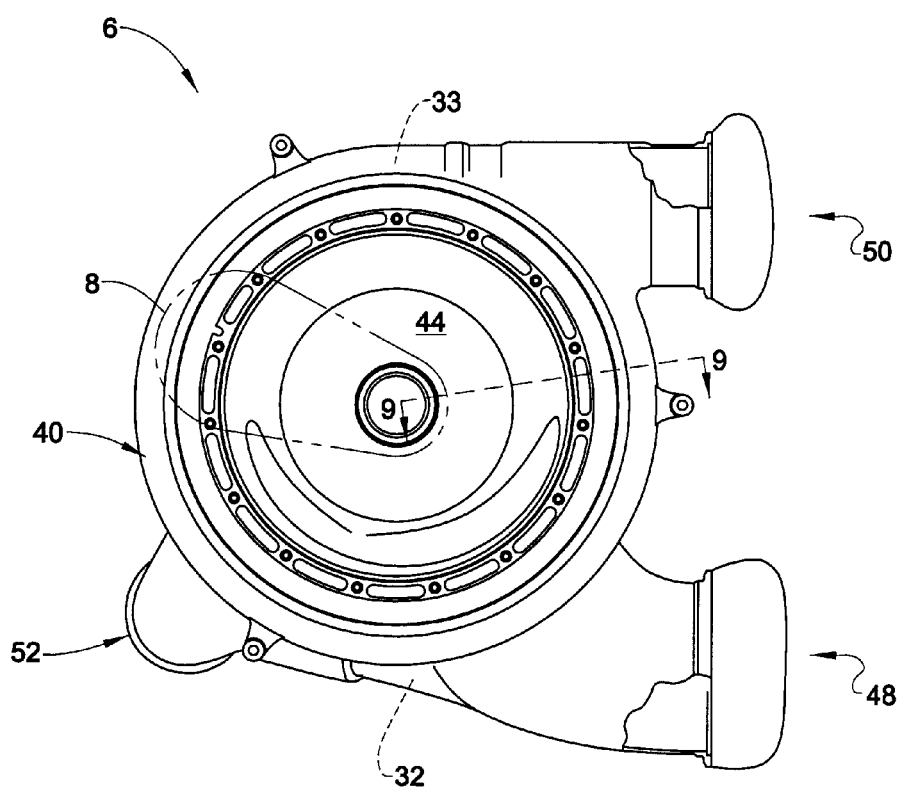
FIG. 4 is a plan view of a second, opposing, side of the compressor housing of FIG. 1, in accordance with an aspect of an exemplary embodiment.

Compressor portion 6 includes a compressor housing 30 having an inlet passage 32 and an outlet passage 33. A compressor rotor 35 is arranged in compressor housing 30 and is operatively coupled to shaft 17. Rotational energy imparted to shaft 17 via first and second turbine portions 8 and 9 drives compressor rotor 35 to impart energy to a fluid flow passing into inlet passage 32. As shown in FIGS. 2-4, compressor housing 30 includes a body 40 having an exterior surface 42 and an interior portion 44. Compressor housing 30 also includes an inlet 48, an outlet 50 and a bypass 52.

Figure 5:
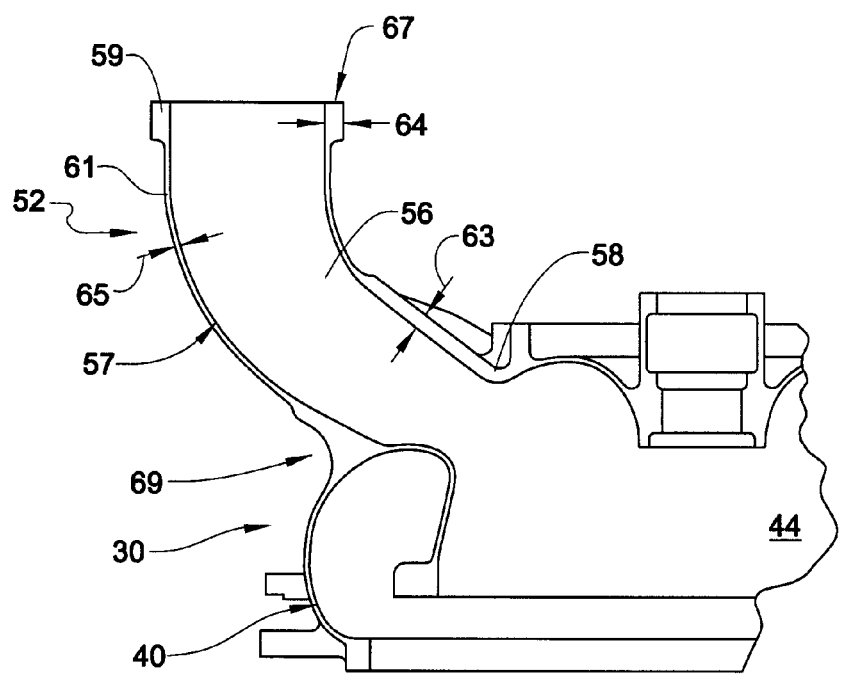
FIG. 5 is a partial cross-sectional view of the compressor housing of FIG. 3 taken through the line 5-5.

In accordance with an aspect of an exemplary embodiment illustrated in FIG. 5, bypass 52 includes a bypass passage 56 fluidically connected with interior portion 44. Bypass passage 56 is defined, at least in part, by a bypass passage wall 57 having a first end portion 58, a second end portion 59 and an intermediate portion 61. First end portion 58 includes a first thickness 63, second end portion 59 includes a second thickness 64, and intermediate portion 61 includes a third thickness 65 which may be less than first and second thicknesses 63 and 64. Further, second thickness 64 may define a flange 67 that provides an interface that may receive, for example, a bypass conduit (not shown). Further, bypass 52 includes a fillet 69 that extends from body 40 and along first end portion 58 of bypass passage wall 57.

In further accordance with an aspect of an exemplary embodiment, first thickness 63 may be between about 0.330-inch (8.382-mm) and 0.390-inch (9.906-mm). In accordance with another aspect of an exemplary embodiment, first thickness 63 may be about 0.360-inch (9.144-mm). In accordance with yet another aspect of an exemplary embodiment, fillet 69 includes a radius of between about 0.970-inches (25.638-mm) and 1.030 inches (26.162-mm). In accordance with still yet another aspect of an exemplary embodiment, fillet 69 includes a radius of about 1.000-inch (25.4-mm). The particular dimensions of first thickness 63 and fillet 69 provides both particular strength characteristics as well as weight properties that are desirable for compressor housing 30. For example, the particular dimensions of first thickness 63 and fillet 69 enable compressor housing 30 to withstand operating pressures associated with an aviation environment while avoiding additional weight which is less than desirable in many aviation applications.

Figure 6:
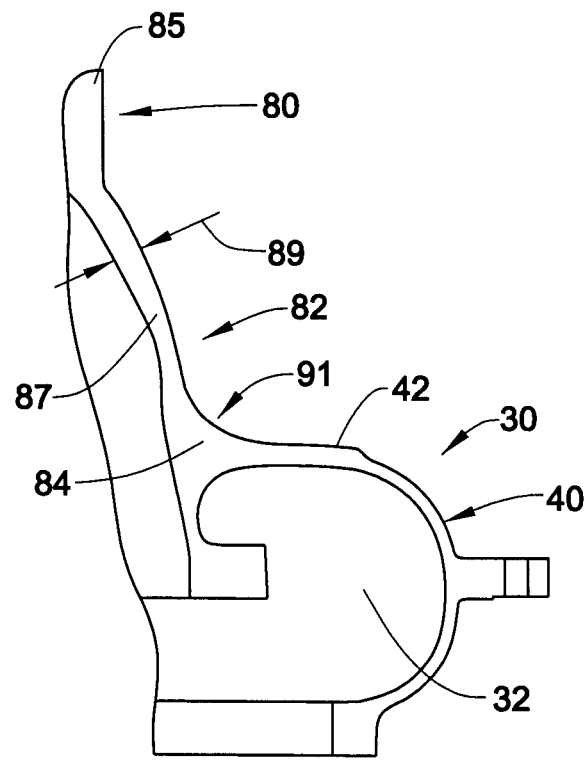
FIG. 6 is a partial cross-sectional view of the compressor housing of FIG. 3 taken through the line 6-6.

In accordance with another aspect of an exemplary embodiment, compressor housing 30 includes a first turbine mounting flange 80 provided on exterior surface 42. First turbine mounting flange 80 supports second turbine portion 9. As shown in FIG. 6, first turbine mounting flange 80 includes a turbine flange wall 82 having a first end section 84, a second end section 85 and an intermediate section 87. First end section 84 extends outwardly from body 40 and includes turbine flange wall thickness 89 and a turbine flange fillet 91.

In accordance with an aspect of an exemplary embodiment, turbine flange wall thickness 89 may be between about 0.290-inches (7.366-mm) and about 0.350-inches (8.890-mm). In accordance with another aspect of an exemplary embodiment turbine flange wall thickness 89 may be about 0.320-inches (8.128-mm). In accordance with still another aspect of an exemplary embodiment, turbine flange fillet 91 may include a radius of between about 0.470-inch (11.938-mm) and about 0.530-inches (13.462-mm). In accordance with still yet another aspect of an exemplary embodiment, turbine flange fillet 91 may include a radius of about 0.5-inch (12.7-mm). In a manner similar to that described above, the particular dimensions of flange wall thickness 89 and turbine flange fillet 91 provide particular strength characteristics as well as weight properties that are desirable for compressor housing 30. For example, the particular dimensions of turbine flange thickness 89 and turbine flange fillet 91 enable compressor housing 30 to withstand operating pressures associated with an aviation environment while avoiding additional weight which is less than desirable in many aviation applications.

Figure 7:
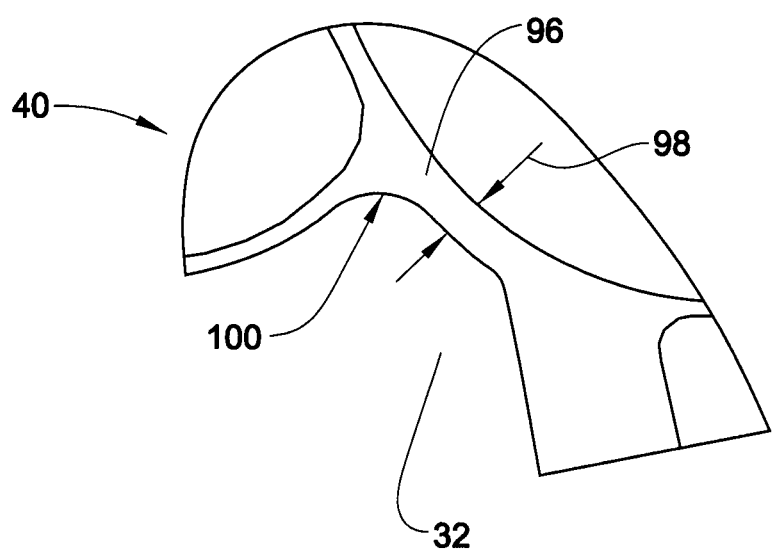
FIG. 7 is a partial cross-sectional view of the compressor housing of FIG. 3 taken through the line 7-7.

In accordance with still yet another aspect of an exemplary embodiment illustrated in FIG. 7, body 40 includes an annular inlet wall 96 that defines, at least in part, inlet passage 32. Annular inlet wall 96 includes an inlet wall thickness 98 and an annular fillet 100. In accordance with an aspect of an exemplary embodiment, inlet wall thickness 96 may be between about 0.230-inches (5.842-mm) and about 0.290-inches (7.366-mm). In accordance with another aspect of an exemplary embodiment, inlet wall thickness 96 may be about 0.260-inches (6.604-mm). In still further accordance with an aspect of an exemplary embodiment, annular fillet 100 may include a fillet radius of between about 0.47-inches (11.94-mm) and about 0.53-inches (13.46-mm). In accordance with yet another aspect of an exemplary embodiment, annular fillet 100 may include a fillet radius of about 0.500-inch (12.7-mm).

In a manner similar to that described above, the particular dimensions of inlet wall 92 and annular fillet 100 provide both strength characteristics as well as light weight properties that are desirable for compressor housing 30. For example, the particular dimensions of inlet wall 92 and annular fillet 100 enable compressor housing 30 to withstand operating pressures associated with an aviation environment while avoiding additional weight which is less than desirable in many aviation applications.

Figure 8:
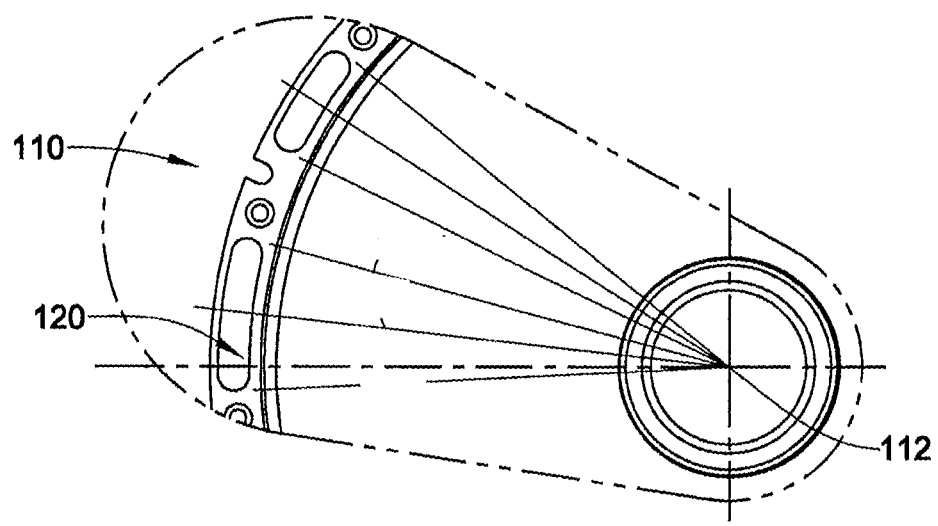
FIG. 8 is a partial cross-sectional view of the compressor housing of FIG. 4 taken through the line 8-8.
Figure 9:
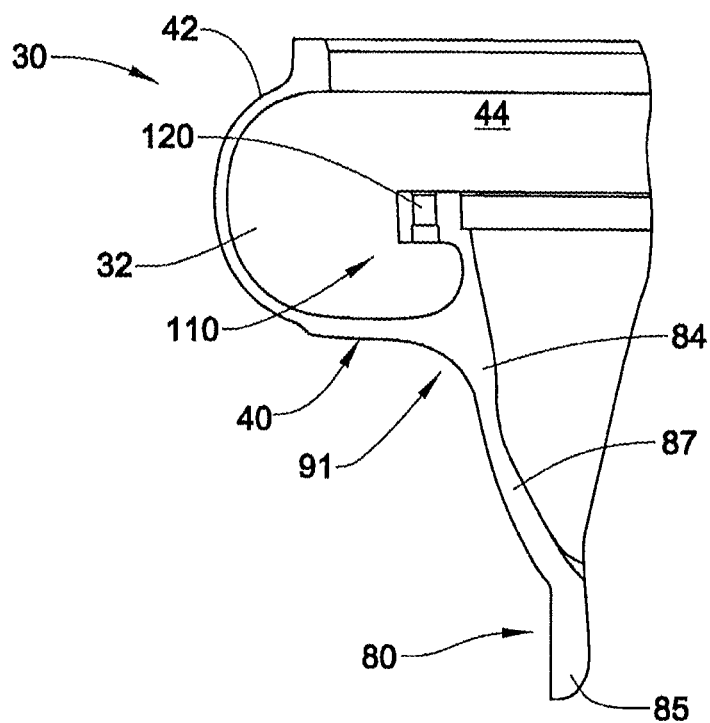
FIG. 9 is a partial cross-sectional view of the compressor housing of FIG. 4 taken through the line 9-9.

In further accordance with yet still another an aspect of an exemplary embodiment illustrated in FIGS. 8-9, compressor housing 30 includes a second turbine mounting flange 110 arranged within interior portion 44. Second turbine mounting flange 110 extends annularly about a center 112 of interior portion 44 and supports first turbine portion 8. In accordance with an aspect of an exemplary embodiment, first turbine mounting flange 110 includes an inner diameter 114 of between about 11.9985-inches (30.4762-cm) and about 12.0015-inches (30.4838-cm). In accordance with another aspect of an exemplary embodiment, inner diameter 114 of second turbine mounting flange 110 may be about 12.00-inches (30.48-cm).

In further accordance with an aspect of an exemplary embodiment, second turbine mounting flange 110 includes a plurality of weight reducing pockets 120. In accordance with one aspect, the plurality of weight reducing pockets 120 includes exactly 15 pockets. In accordance with yet another aspect, the plurality of weight reducing pockets 120 includes an inner radius of about 6.20-inches (15.75-cm). In accordance with still yet another aspect, the plurality of weight reducing pockets 120 includes an inner radius of about 6.60-inches (16.76-cm).

In a manner similar to that described above, the particular dimensions of second turbine mounting flange 110 as well as the number and dimensions of plurality of weight reducing pockets 120 provide strength characteristics as well as weight properties that are desirable for compressor housing 30. For example, the particular dimensions of second turbine mounting flange 110 as well as the number and dimensions of plurality of weight reducing pockets 120 enable compressor housing 30 to withstand operating pressures associated with an aviation environment while avoiding additional weight which is less than desirable in many aviation applications.

The term "about" is intended to include the degree of error associated with measurement of the particular quantity based upon the equipment available at the time of filing the application. For example, "about" can include a range of 8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air cycle machine (ACM) compressor housing comprising:
   a body including an exterior surface and an interior portion;
   an inlet integrally formed with the body, the inlet including an inlet passage fluidically connected with the interior portion;

an outlet integrally formed with the body, the outlet including an outlet passage fluidically connected with the interior portion; and a bypass integrally formed with the body, the bypass including a bypass passage fluidically connected with the interior portion, the bypass passage including a first end portion extending outwardly from the body, a second end portion and an intermediate portion extending therebetween, the first end portion including a wall thickness of between 0.330-inch and 0.390-inch.

2. The ACM compressor housing according to claim 1, wherein the first end portion includes a wall thickness of 0.360-inch.

3. The ACM compressor housing according to claim 1, further comprising: a fillet extending from the body to the first end portion of the bypass, the fillet including a radius of between 0.970-inches and 1.030 inches.

4. The ACM compressor housing according to claim 3, wherein the fillet includes a radius of 1.000-inch.

5. The ACM compressor housing according to claim 1, further comprising: a turbine mounting flange integrally formed with the body, the turbine mounting flange including a turbine flange wall having a thickness of between 0.290-inches and about 0.350-inches.

6. The ACM compressor housing according to claim 5, wherein the thickness of the turbine flange is 0.320-inches.

7. The ACM compressor housing according to claim 5, further comprising: a turbine flange fillet extending from the body to the turbine flange, the turbine flange fillet having a radius of between 0.470-inch and 0.530-inches.

8. The ACM compressor housing according to claim 1, wherein the body includes an annular wall extending from the inlet and at least partially defining the inlet passage, the annular wall having a thickness of between 0.230-inches and 0.290-inches.

9. The ACM compressor housing according to claim 8, wherein the thickness of the annular wall is 0.260-inches.

10. The ACM compressor housing according to claim 1, further comprising: an annular turbine mounting flange arranged within the interior portion, the annular turbine mounting flange including an inner diameter of between 11.9985-inches and 12.0015-inches.

11. The ACM compressor housing according to claim 10, wherein the inner diameter of the annular turbine flange is 12.00-inches.

12. The ACM compressor housing according to claim 10, wherein the annular turbine flange includes a plurality of weight reducing pockets.

13. The ACM compressor housing according to claim 12, wherein the plurality of weight reducing pockets includes exactly 15 weight reducing pockets extending about the annular turbine flange.

\* \* \* \* \*